(12) United States Patent
Borer et al.

(10) Patent No.: US 12,510,440 B2
(45) Date of Patent: Dec. 30, 2025

(54) WHEEL CARRIER FOR SUPPORTING A WHEEL ARRANGED ON A BOGIE AND TEST STAND FOR TESTING BOGIES OF RAILWAY VEHICLES

(71) Applicant: Nencki AG, Langenthal (CH)

(72) Inventors: Hans Borer, Lohn-Ammannsegg (CH); Thomas Schertenleib, Langenthal (CH)

(73) Assignee: Nencki AG (CH)

( * ) Notice: Subject to any disclaimer, the term of this patent is extended or adjusted under 35 U.S.C. 154(b) by 395 days.

(21) Appl. No.: 18/269,294

(22) PCT Filed: Dec. 15, 2021

(86) PCT No.: PCT/EP2021/086008
§ 371 (c)(1),
(2) Date: Jun. 23, 2023

(87) PCT Pub. No.: WO2022/136066
PCT Pub. Date: Jun. 30, 2022

(65) Prior Publication Data
US 2024/0085277 A1    Mar. 14, 2024

(30) Foreign Application Priority Data
Dec. 23, 2020    (WO) ................. PCT/EP2020/087793

(51) Int. Cl.
*G01M 17/10*    (2006.01)
(52) U.S. Cl.
CPC .................. *G01M 17/10* (2013.01)
(58) Field of Classification Search
CPC .................................................. G01M 17/10
See application file for complete search history.

(56) References Cited

U.S. PATENT DOCUMENTS

| 4,800,748 A | * | 1/1989 | Fischer | G01M 17/10 73/146 |
| 5,600,059 A | * | 2/1997 | Sondey | G01M 15/02 73/116.02 |

(Continued)

FOREIGN PATENT DOCUMENTS

| EP | 1918689 A2 | 5/2008 |
| EP | 2705344 B1 | 3/2014 |
| KR | 20180079432 A | 7/2018 |

OTHER PUBLICATIONS

EP1918689 (A2) English Language Translation.
EP2705344 (B1) English Language Translation.
KR20180079432 (A) English Language Translation.

*Primary Examiner* — Eric S. McCall
(74) *Attorney, Agent, or Firm* — Lerner David LLP

(57) ABSTRACT

A wheel carrier is disclosed for supporting a running wheel arranged on a bogie. The wheel carrier comprises a lifting unit with a platform. A first linear slide movable along a longitudinal guide extending in a running direction perpendicular to the application direction is included. Additionally, a second linear slide movable in a running direction along the longitudinal guide is also included. A first lever mechanism is arranged for coupling the first linear slide to the platform. A second lever mechanism is arranged for coupling the second linear slide to the platform. A distance between the first linear slide and the second linear slide is variable so that a distance of the platform from the first linear slide and from the second linear slide is variable in the application direction.

20 Claims, 5 Drawing Sheets

(56) References Cited

U.S. PATENT DOCUMENTS

| | | | | |
|---|---|---|---|---|
| 5,629,476 A * | 5/1997 | Sondey | ............... | G01M 15/02 |
| | | | | 73/116.04 |
| 5,864,065 A * | 1/1999 | Prorok | ............... | G01N 29/28 |
| | | | | 73/598 |
| 12,264,989 B2 * | 4/2025 | Matsumoto | ............ | G01M 17/10 |
| 2012/0042720 A1 * | 2/2012 | Bastian | ............... | G01M 17/10 |
| | | | | 73/115.07 |
| 2012/0325005 A1 * | 12/2012 | Oliver | ............... | G01M 17/10 |
| | | | | 73/637 |
| 2013/0019686 A1 * | 1/2013 | Oliver | ............... | B61K 9/12 |
| | | | | 73/622 |
| 2022/0268651 A1 * | 8/2022 | Rau | ............... | G01L 5/00 |
| 2022/0307943 A1 * | 9/2022 | Chen | ............... | G01M 17/10 |
| 2024/0053232 A1 * | 2/2024 | Schertenleib | ......... | G01M 17/10 |

\* cited by examiner

WHEEL CARRIER FOR SUPPORTING A WHEEL ARRANGED ON A BOGIE AND TEST STAND FOR TESTING BOGIES OF RAILWAY VEHICLES

CROSS REFERENCE TO RELATED APPLICATIONS

This application is a national phase application of International Application No. PCT/EP2021/086008, filed Dec. 15, 2021, which claims priority to International Patent Applications PCT/EP2020/087793, filed on Dec. 23, 2020, the content of all of the aforementioned of which is herein incorporated by reference.

BACKGROUND OF THE INVENTION

Field of the Invention

The invention relates to a wheel carrier for supporting a running wheel arranged on a bogie and to a test stand for testing bogies of rail vehicles, comprising a support device with a plurality of such wheel carriers for supporting in each case a running wheel arranged on the bogie during a testing operation. The invention further relates to a method for testing a bogie of a rail vehicle.

Description of Related Art

A bogie test stand is used to measure and test various parameters of rail vehicle bogies. In particular, forces are applied to the bogie along a linear axis or several linear axes by means of a load application unit in order to simulate the impact forces to be expected in operation due to the vehicle weight and static and dynamic influences. Various functions and parameters, e.g. wheel loads, axle distances, deflection, etc., are then tested or determined. Depending on the equipment of the test stand, it is possible to test the axle distance, axle parallelism, suspension, wheel runout, wheel diameter, etc. fully automatically.

After the test, all values are stored in a database and can be printed out as a test report. The data can be transferred to a higher-level system.

The load application unit exerts linear forces on the bogie, usually forces directed vertically downwards. For this purpose, a defined position is approached by means of direct path measurement. Subsequently, the force setpoint is approached in a force-controlled manner. As a rule, two load application units are provided, which are arranged on a crossbeam so as to be movable relative to each other along a horizontal axis for adaptation to different bogie dimensions or geometries. In this way, forces can be simulated as they occur, for example, when driving through curves.

Known load application units include hydraulic or electric load cylinders. Hydraulic load cylinders are designed, for example, as differential hydraulic cylinders and include a servo valve. They are controlled via an industrial PC, for example. Such hydraulic cylinders are sensitive to lateral forces acting on the piston rod. A so-called auxiliary yoke is therefore usually provided to absorb transverse forces. Accordingly, despite the fact that hydraulic cylinders are actually inexpensive, this results in relatively high costs for the overall design. Maintenance and servicing costs are also relatively high.

Electric load cylinders are an alternative. They are designed, for example, as screw jacks with ball screw drives. They are driven by a synchronous motor, which is usually controlled by a specific drive amplifier. However, such drives and corresponding spare parts are comparatively expensive.

To enable different bogie models to be tested, such as engine and running bogies, different track gauges, 2-axle and 3-axle bogies, the relevant dimensions of the test stand can be adapted to the different requirements by adjusting individual components manually or automatically.

Bogie test stands are known which comprise individual wheel carriers, each wheel arranged on the bogie being supported by one of the wheel carriers for testing. The track width and the center distance can be set by adjusting the wheel carrier positions accordingly. For example, EP 1 918 689 B1 (Schenck Process GmbH) shows a bogie test stand with a height-adjustable inlet rail device and at least four positioning units (wheel carriers) with receiving prisms for the running wheels. The bogie is run into the test stand on the wheel flanges via the inlet rail device, and the inlet rail device is then lowered so that the running wheels can be picked up by the receiving prisms. The positioning units comprise a lower X-carriage, a Y carriage, a height-adjustable Z lifting device and a fine-adjusting upper X carriage arranged on the X-carriage with the receiving prism, the measuring device for the wheel contact force and a distance sensor.

In known bogie test stands, the bogie is run into the actual test stand, on the inlet rails, manually, if necessary supported by a rope or cable winch.

The design of such wheel carriers, with several linear guides perpendicular to each other, is complex, especially since these linear guides must be dimensioned to withstand the high contact forces.

BRIEF SUMMARY OF THE INVENTION

It is the task of the invention to create a wheel carrier belonging to the technical field mentioned at the beginning, which has a simple and mechanically stable construction.

According to the invention, the wheel carrier comprises a lifting unit with the following components:
 a platform;
 a first linear slide which is movable along a longitudinal guide extending in a running direction perpendicular to an application direction;
 a second linear slide that which is movable along the longitudinal guide in the running direction;
 a first lever mechanism for coupling the first linear slide to the platform; and
 a second lever mechanism for coupling the second linear slide to the platform.

A distance between the first linear slide and the second linear slide is variable so that a distance of the platform from the first linear slide and from the second linear slide can be changed in the application direction.

The distance of the platform from the first linear slide and from the second linear slide in the application direction can be changed due to the first lever mechanism and the second lever mechanism by changing the distance between the first linear slide and the second linear slide. Thus, the first lever mechanism and the second lever mechanism are configured such that by changing the distance between the first linear slide and the second linear slide, the distance of the platform from the first linear slide and from the second linear slide in the application direction is changeable.

The distance can be changed in particular by moving the first linear slide and the second linear slide along the longitudinal guide in the running direction or against the running direction, respectively, covering different displacement distances. One of the linear slides can be stationary and the other linear slide can be moved. It is also possible to move both linear slides in the same direction (with different travel) or in the opposite direction (with the same or different travel).

Preferably, two load application units are provided, which are arranged on a cross member so as to be displaceable relative to each other along a horizontal axis for adaptation to different bogie dimensions or geometries.

The parallel kinematic mechanism according to the invention allows movements both in the running direction (X-axis) and in the application direction (Z-axis), whereby forces exerted by the bogie on the running wheels can be absorbed in the best possible way essentially independently of the X- and Z-positions. Compared with the serial arrangement known from the prior art, only one mechanism is thus required for the corresponding degrees of freedom. This results in a simpler design and improved force absorption.

As explained below, the distance between the platform on the one hand and the linear slides (or longitudinal guide) on the other is adjusted for various purposes. These include, for example, gripping and releasing a running wheel of the bogie to be tested, lifting the bogie from an inlet rail, adapting to different wheel and/or bogie geometries, or performing certain tests that require active independent height adjustment of the individual wheels.

The movement of the linear slides along the longitudinal guide not only serves to adjust the height of the platform, but can also serve other purposes, such as adapting the wheel carrier positions to the dimensions of the bogie (e.g. to the axle distance), pulling the bogie into the device and/or centering the bogie under the load application unit.

Preferably, the first lever mechanism comprises two four-bar linkages, and the second lever mechanism comprises two further four-bar linkages, wherein the lever axes of all levers of the four-bar linkages extend parallel to each other and perpendicular to the running direction. The levers are preferably all of the same length, so that two levers each define a parallelogram. This enables a particularly simple and stable design, whereby the parallelism of the platform to the longitudinal guide can be ensured without further measures.

The lever axes preferably extend perpendicular to the running direction. In particular, the longitudinal guide advantageously runs in a horizontal direction, while the application direction is directed vertically downwards and the lever axes run horizontally, transverse to the running direction.

Advantageously, the two four-bar linkages of the first lever mechanism are spaced apart from each other in a direction of the lever axes, and the two four-bar linkages of the second lever mechanism are also spaced apart from each other in a direction of the lever axes.

A distance between the two four-bar linkages as large as possible is advantageous because it improves the stability of the design, especially in the case of impact forces that do not act centrally on the platform of the wheel carrier. Particularly preferably, the two four-bar linkages of the first lever mechanism and the two four-bar linkages of the second lever mechanism are each hinged on both sides of the respective platform. This results in a maximum distance without significantly increasing the overall width of the device.

Alternatively, the spaced four-bar linkages may be hinged to the underside of the platform.

Instead of the four-bar linkages, the wheel carriers can also be realized with individual levers, especially if a linear guide for the platform is additionally arranged on the wheel carrier, extending along the application direction.

Preferably, the first linear slide and the second linear slide are mechanically connected to each other by a device for adjusting their distance from each other. This allows to precisely and easily adjust the distance between the linear slides and thus the distance of the platform from the linear slides. Preferably, the mechanism also serves to absorb forces in the direction of the longitudinal guide. In particular, forces acting on the platform from the bogie result in opposing axial forces parallel or anti-parallel to the running direction. A connecting mechanism capable of absorbing all or part of these forces prevents the forces from being transmitted from the linear slides to the linear guide. The linear slides thus primarily transmit forces parallel to the application direction to the linear guide or its supporting structure.

Advantageously, the device for adjusting the distance comprises
 a) a threaded spindle mounted rotatably and axially immovably on one of the linear slides, the axis of rotation of which extends in the running direction, and
 b) a rotatable driver arranged on the other of the linear slides.

By means of a rotary movement of the threaded spindle, the other linear slide can thus be moved relative to the first linear slide in the direction of the spindle rotation axis. The rotatable driver is mounted on the other linear slide, in particular rotatably, but axially immovably, and it comprises an internal thread which cooperates with an external thread of the threaded spindle.

If designed accordingly, lead screws are suitable for absorbing high forces and allow precise and stepless adjustment of the distance between the two linear slides.

Particularly preferably, the threaded spindle and the driver form a ball screw drive. This minimizes the friction between the components, resulting in particular in a lower breakaway torque and reduced wear.

In principle, other spindle drives with suitably designed spindle and bearings can also be used.

Alternatively, the two linear slides have independent drives so that they can be adjusted and positioned independently of each other along the longitudinal guide. In this case, means must be provided to absorb the aforementioned forces in the running direction.

Advantageously, a drive motor is arranged on the first linear slide, the output of which drive motor acting on a pinion, the pinion cooperating with a rack extending in the running direction for displacing the first linear slide. Rack and pinion drives allow precise positioning and large travel distances, and the component cost on the rail side is minimized. In particular, no complex components are required at the ends of the displacement path.

The drive motor is in particular a servomotor. In embodiments with a spindle for adjusting the distance between the linear slides, the drive motor for the spindle and the drive motor for the pinion-rack drive can be arranged on the same linear slide, or the drive motor for the pinion-rack drive is arranged on the first linear slide, while the drive motor for the spindle is arranged on the second linear slide.

Instead of a rack-and-pinion arrangement, other drives can be used, e.g. spindle drives, belt or chain drives, linear drives, etc.

A test stand according to the invention for testing bogies of rail vehicles comprises a support device for supporting a bogie during a testing operation, the support device comprising a plurality of wheel carriers according to the invention, each for supporting a running wheel arranged on the bogie.

In a first embodiment, the test stand comprises a load application unit for generating a linear application force on the bogie, comprising a force generation unit for generating a basic force and a transmission device for transmitting the basic force into the application force oriented in an application direction, acting on the bogie. This allows a single bogie to be tested.

In a second embodiment, the support device of the test stand comprises at least eight wheel carriers according to the invention in order to support all the running wheels of at least two bogies arranged on a car body. Thus, all the running wheels of two bogies arranged on a car body can be supported simultaneously by corresponding wheel carriers. Then, in particular, a torsion test is carried out by adjusting different heights of the wheel carriers, with the linear impact force being exerted by means of a dead weight of the car body.

With the aid of the wheel carriers according to the invention, which can be displaced along the longitudinal guide, a distance between two groups of wheel carriers can be easily adjusted to a distance between the bogies on the car body.

Advantageously, the test stand comprises two parallel inlet rails extending in the running direction for feeding the bogie to be measured. The bogie can then be easily fed to the test position in the running direction by means of the running wheels, in particular by rolling on the wheel flange.

The infeed rails must absorb high forces in the application direction. The inlet rails are therefore preferably fixed in the vertical direction and in the running direction. This eliminates the need for an assembly for adjusting the height of the inlet rails, which would have to be able to absorb the high forces mentioned in the application direction.

At least one of the inlet rails can be adjustably mounted in the transverse direction so that the test stand can be adapted to different track widths. Corresponding adjustment devices can be realized, for example, by linear guides running in the transverse direction, on which support structures of the inlet rails are mounted. A corresponding adjustment usually takes place relatively infrequently and can be manual or automatic.

Advantageously, the longitudinal guide and the inlet rails are arranged in such a way that wheel receiving devices arranged on the platforms of the wheel carriers are movable by a vertical movement of the respective platform between an engagement position and a release position, wherein in the engagement position forces can be transmitted in the running direction between the respective wheel receiving device and the respective wheel, while in the release position the respective wheel carrier is freely movable in the running direction with respect to the bogie.

In the engagement position, the bogie can thus be positioned relative to the load application unit by the coordinated movement of the wheel carriers in the running direction.

Preferably, the engagement position is defined in such a way that the running wheels of the bogie can roll with their running surfaces or on the wheel flange on the inlet rails. During the positioning of the bogie, the vertical forces are thus still absorbed completely or to a large extent by the infeed rail.

Preferably, each of the wheel carriers includes a wheel receiving device disposed on the platform and a force measuring unit for measuring a force applied to the wheel receiving device.

The wheel mounting device advantageously comprises two rotatable rollers for interaction with the running surface of the respective running wheel. This makes it easier to move the bogie in the engagement position of the wheel receiving devices while the running wheels roll with their wheel flanges on the inlet rails. Particularly preferably, at least one of the rollers can be actively driven. In this way, static deformation of the wheel due to the forces acting during the test process can be avoided. Driven wheels can also be used for more extensive tests, e.g. to check the roundness of the wheels, the centricity of the wheel bearings or the like.

Instead of rollers, other elements can also be used, e.g. prismatic holders.

A method according to the invention for testing a bogie of a rail vehicle comprises the following steps:
a) running in the bogie along a running direction by running off flanges of running wheels arranged on the bogie on two parallel inlet rails;
b) positioning the bogie and a plurality of wheel carriers of a support device relative to each other, along the running direction, so that each of the running wheels is associated with a wheel carrier, wherein each of the wheel carriers comprises a lifting unit comprising a platform, a first linear slide slidable along a longitudinal guide extending in the running direction, a second linear slide slidable along the longitudinal guide in the running direction, a first lever mechanism for coupling the first linear slide to the platform, and a second lever mechanism for coupling the second linear slide to the platform;
c) gripping the bogie by reducing a distance between the first linear slide and the second linear slide of the lifting units so that the wheel carriers are lifted and grip the wheels in the area of their tread;
d) lifting the bogie until the wheel flanges are lifted off the inlet rails;
e) testing the bogie by applying a linear application force to the bogie, the linear application force being perpendicular to the running direction, and measuring forces acting on the wheel carriers.

To test a single bogie, it is positioned in an application position of a load application unit by moving the wheel carriers along the running direction. The force is then applied by a load application unit. The bogie can be grasped directly in a takeover position by all the wheel carriers and moved to the application position (test position). In a preferred embodiment, only the wheels of the foremost pair of wheels in the feed direction are initially gripped, namely by the rearmost wheel carriers in the feed direction. The bogie is then moved in the feed direction with the aid of these two wheel carriers until the wheel carriers can be repositioned. The wheels of the first pair of wheels are released again, and all the wheel carriers are then moved under the respective wheels and lifted so that the bogie can be gripped with all wheels and then moved to the test position. With this embodiment, the required travel distance of the wheel carriers along the longitudinal guide can be significantly reduced.

The bogies can be inserted safely and quickly in the manner described in the invention. It is neither necessary to attach drive means such as ropes or cables of a winch to the bogie, nor to position the bogie manually, but the positioning can be initiated and monitored from a safe distance. Accordingly, the risk of accidents is minimized.

When subjected to impact forces, typical bogies deform, namely there is a slight increase in the axle distance due to the usual rocker geometry. Therefore, when testing the bogie, all linear slides are advantageously free to move in the running direction, while the distances between the first linear slide and the second linear slide of each wheel carrier are fixed. With the release of the linear slides, the increased axle distance can be absorbed without further ado.

In a preferred embodiment, at each of the wheel carriers a drive motor is arranged on the first linear carriage, the output of which drive motor acting on a pinion, the pinion cooperating with a rack extending in the running direction for displacing the first linear carriage, wherein for testing the bogie the pinion is released for free rotation, in particular by de-energizing an electric drive motor for the pinion.

The drive motors are servomotors in particular. These and any downstream gear units are advantageously designed so that only low braking forces act on the output when the motor is de-energized. Alternatively, a switchable coupling can be used between the motor and pinion or between the gear unit and pinion.

Instead of a rack-and-pinion arrangement, other drives can be used, e.g. spindle drives, belt or chain drives, etc.

In the process according to the invention, the insertion of washers can be simulated by individually adjusting the heights of the wheel carriers.

This eliminates the need for test insertion of shim plates until the correct configuration is found. Adjusting or changing the height of the wheel carriers can be done under full load, so that simulation, verification and improvement can be done in an iterative process without time delay.

In a similar way, by varying the height settings of the wheel carriers, a torsion test of the bogie can also be performed.

BRIEF DESCRIPTION OF THE SEVERAL VIEWS OF THE DRAWINGS

Further advantages features and details of the various embodiments of this disclosure will become apparent from the ensuing description of a preferred exemplary embodiment or embodiments and further with the aid of the drawings. The features and combinations of features recited below in the description, as well as the features and feature combination shown after that in the drawing description or in the drawings alone, may be used not only in the particular combination recited but also in other combinations on their own without departing from the scope of the disclosure.

The following is an advantageous embodiment of the invention with reference to the accompanying figures, wherein.

DETAILED DESCRIPTION OF THE INVENTION

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B, or C", then, unless specifically stated otherwise or infeasible, the component may include A, or B, or C, or A and B, or A and C, or B and C, or A and B and C. Expressions such as "at least one of" do not necessarily modify an entirety of the following list and do not necessarily modify each member of the list, such that "at least one of "A, B, and C" should be understood as including not only one of A, only one of B, only one of C, or any combination of A, B, and C.

Figure 1:
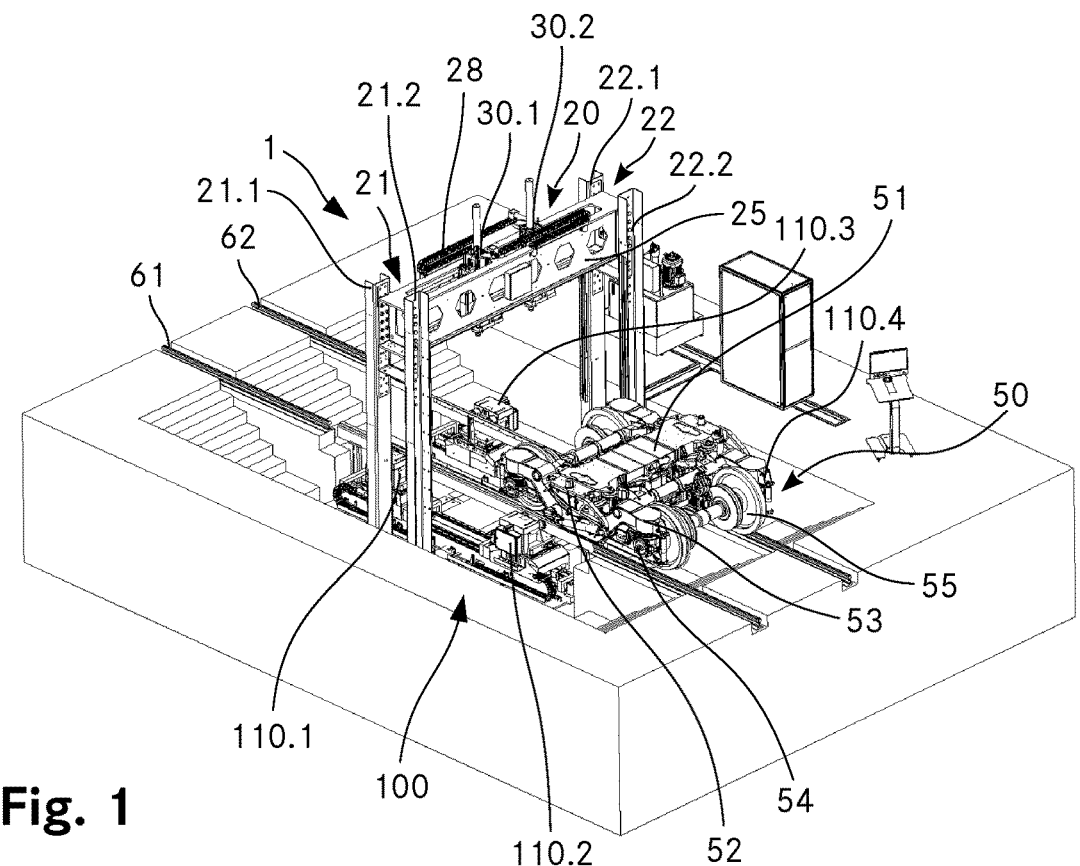
FIG. 1 depicts an oblique view of an embodiment of the test stand for bogies of rail vehicles according to the invention, at the beginning of the bogie feed.
Figure 2:
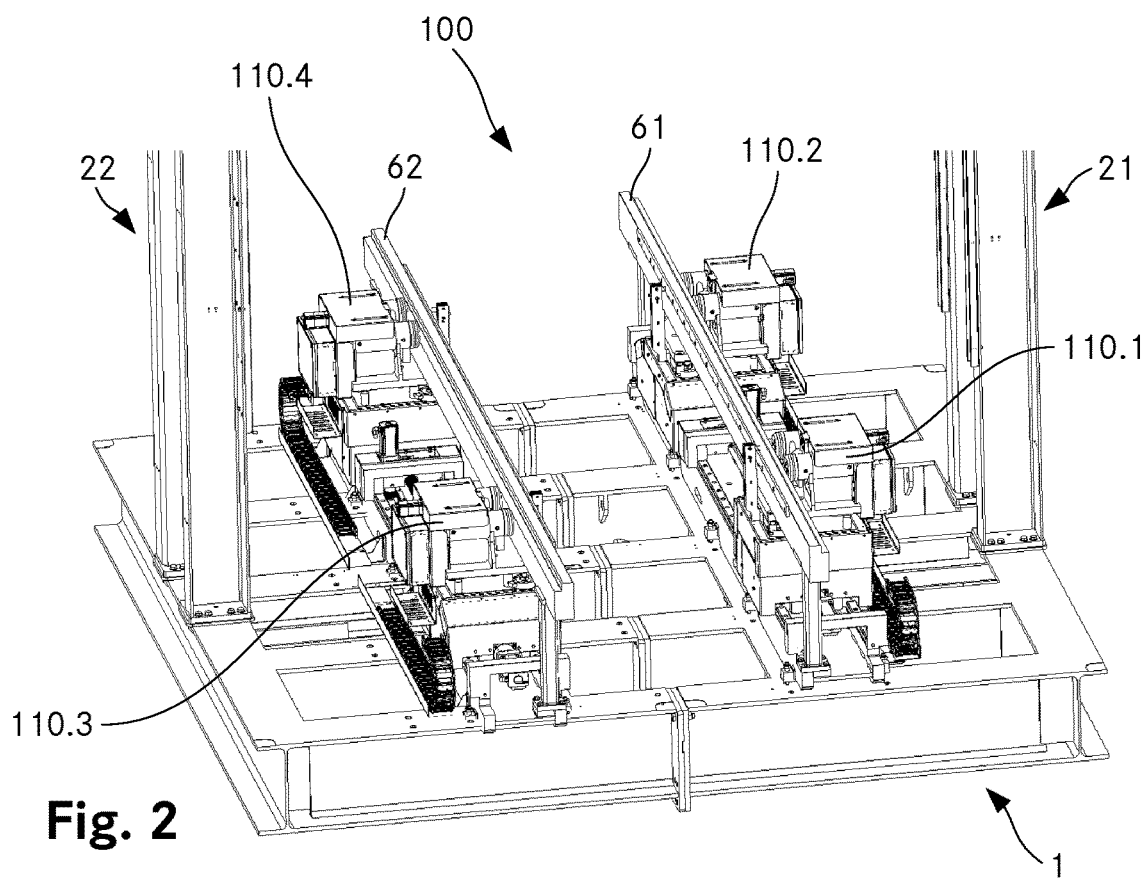
FIG. 2 depicts an oblique view of the support device for the bogie.
Figure 3:
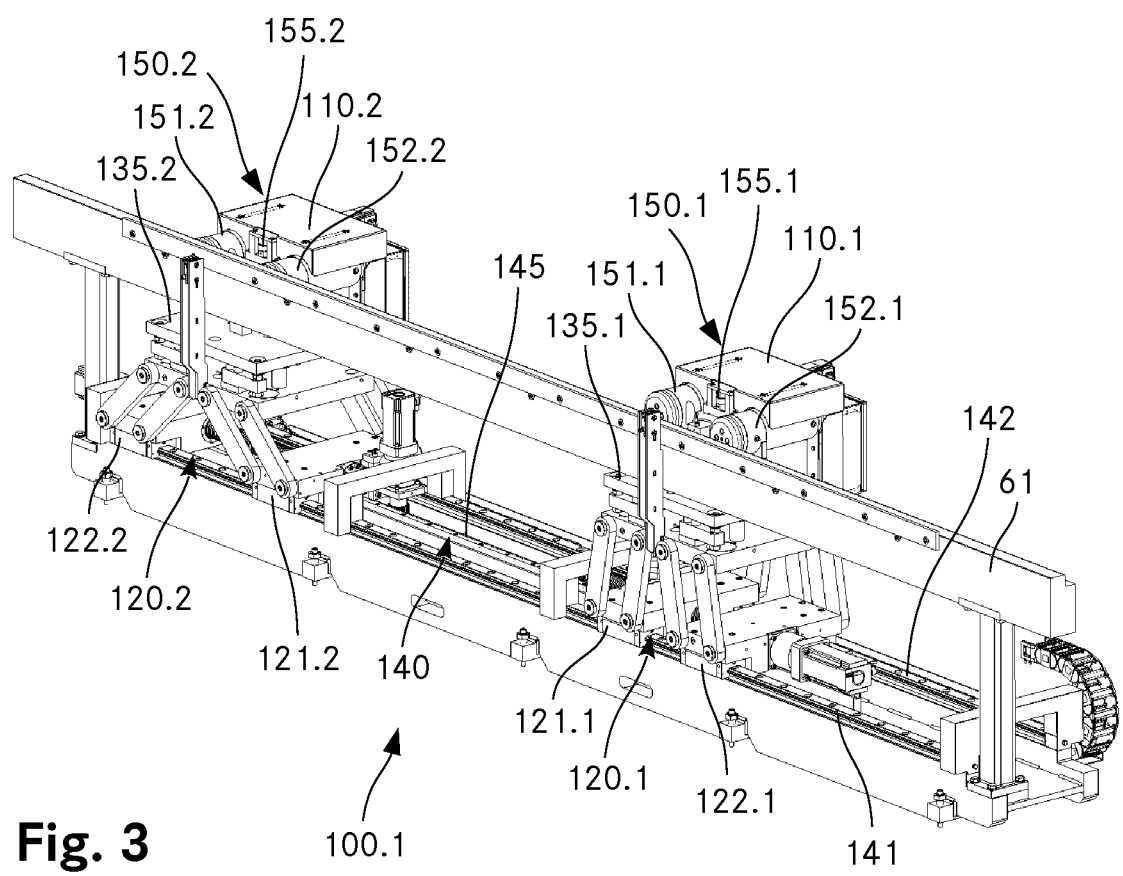
FIG. 3 depicts an oblique view of one side of the support device with two wheel carriers.

FIG. 1 shows an oblique view of an embodiment of the test stand for bogies of rail vehicles according to the invention, at the beginning of the bogie feed. FIG. 2 shows an oblique view of the support device for the bogie. FIG. 3 shows an oblique view of one side of the support device with two wheel carriers.

The test stand 1 comprises two parallel inlet rails 61, 62. Their height is fixed, while one of the inlet rails 61 is adjustable in the transverse direction and the other is also fixed in the transverse direction.

The bogie 50 is moved into the test position of the test stand 1 on the inlet rails 61, 62. The bogie 50 comprises a bogie frame 51 on which the wheel axles 54 with the wheels 55 of the bogie 50 are mounted via secondary springs 52 and wheel bearings 53 with primary suspension.

At the test position, the test stand 1 comprises a portal 20 with two supports 21, 22, on which a cross member 25 is mounted so as to be vertically displaceable along a linear guide. Each of the supports 21, 22 consists of two vertical beams 21.1, 21.2; 22.1, 22.2, which are arranged parallel to each other. The outer ends of the cross member 25 move in the space between the respective vertical beams 21.1, 21.2; 22.1, 22.2. The linear guide comprises vertical rails and in each case a carriage movable thereon, to which the cross member 25 is attached. A drive motor for a spindle is arranged on each of the slides. The two spindles run horizontally inwards from the respective slide, parallel to the cross member 25, and are used for transverse adjustment of two load application units 30.1, 30.2 arranged on the cross member 25 via a further linear guide. The load application units 30.1, 30.2 are of identical design. The stroke of the cross member 25 at the supports 21, 22 is approx. 1,000 mm, so that the load application units 30.1, 30.2 can interact with different bogies as well as reference measuring cells for calibration.

The load application units 30.1, 30.2 each comprise a device for generating a downward basic force. This may be hydraulic or electric load cylinders in a manner known per se, or preferably a hybrid system with a double-acting hydraulic cylinder, the cylinder chambers of which are supplied with hydraulic fluid by a bi-directional axial piston pump, as described in the pending International Patent Application PCT/EP 2020/085560 dated Dec. 10, 2020, the contents of which are hereby incorporated in this application. At their lower end, the corresponding piston rods have transmission pieces that cooperate with corresponding engagement points on the bogie 50 to transmit an engagement force. In the example shown, the engagement points are located longitudinally centrally on the bogie frame and transversely in each case in a plane defined approximately by the center of the treads of the wheels of the corresponding side.

The cross member 25 further comprises a supply arrangement 28 with drag chains for supplying the load application units 30.1, 30.2 with electrical energy and control signals. Sensor signals from sensors arranged on the load application units 30.1, 30.2 are also transmitted to a control and/or evaluation station via the drag chains of the supply arrangement 28.

The test stand 1 further comprises a support device 100 with four wheel carriers 110.1, 110.2, 110.3, 110.4, wherein two wheel carriers 110.1, 110.2 each cooperate with the first inlet rail 61 and two wheel carriers 110.3, 110.4 cooperate with the second inlet rail 62. FIG. 1 shows one side 100.1 of the support device 100.

Each wheel carrier 110.1, 110.2, 110.3, 110.4 comprises a lifting unit 120.1, 120.2 and a wheel receiving unit 150.1, 150.2 arranged thereon (cf. FIG. 3). The lifting unit 120.1, 120.2 is described in more detail below, in connection with FIGS. 4-6. At its upper end, it has, among other things, a platform 135.1, 135.2 on which the respective wheel receiving unit 150.1, 150.2 is mounted. The wheel receiving unit 150.1, 150.2 has two rotatable rollers 151.1, 152.1; 151.2, 152.2 which can be set in rotation by a servomotor. Their axes of rotation run horizontally and perpendicularly to the inlet rail 61. The wheel receiving unit 150.1, 150.2 also has a centering mechanism 155.1, 155.2 with a plunger which is arranged essentially between the rollers 151.1, 152.1; 151.2, 152.2 and can be moved by a further servomotor via a planetary gear and a spindle drive along a linear axis parallel to the axes of rotation of the rollers 151.1, 152.1; 151.2, 152.2.

Each lifting unit 120.1, 120.2 comprises two linear slides 121.1, 122.1; 121.2, 122.2, which are movably mounted on a linear guide 140 parallel to the inlet rail 61. The linear guide 140 comprises two parallel profile rails 141, 142, parallel to which a toothed rack 145 is arranged. In each case, one of the linear slides 121.1, 121.2 carries a pinion driven by a drive motor, which interacts with the rack 145 to position the respective linear slide 121.1, 121.2 along the linear guide 140. The respective other linear slide 122.1, 122.2 of the lifting unit 120.1, 120.2 is mechanically connected to the first linear slide 121.1, 121.2 via a spindle. This is described in more detail below, in connection with FIGS. 4-6.

The forces exerted on the bogie 50 by the two load application units 30.1, 30.2 can be controlled independently of each other. Thus, both symmetrical and asymmetrical forces can be exerted on the bogie 50 in the transverse direction. By means of suitable measuring devices known per se, the reaction of the bogie 50 to the applied forces can be recorded.

Figure 4:
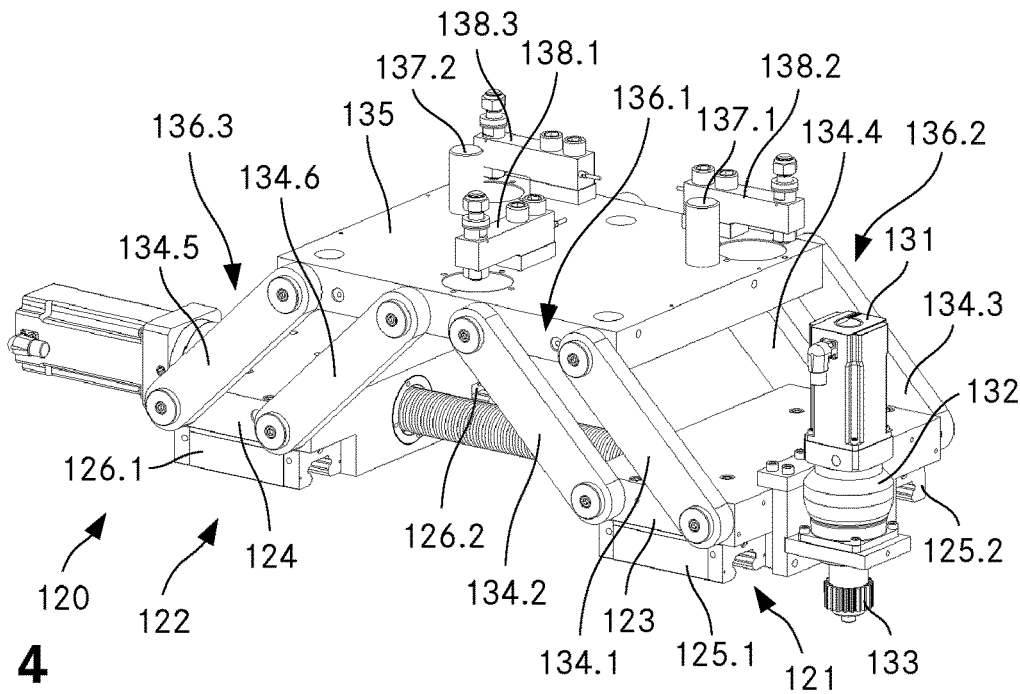
FIG. 4 depicts an oblique view of the lifting unit of a wheel carrier.
Figure 5:
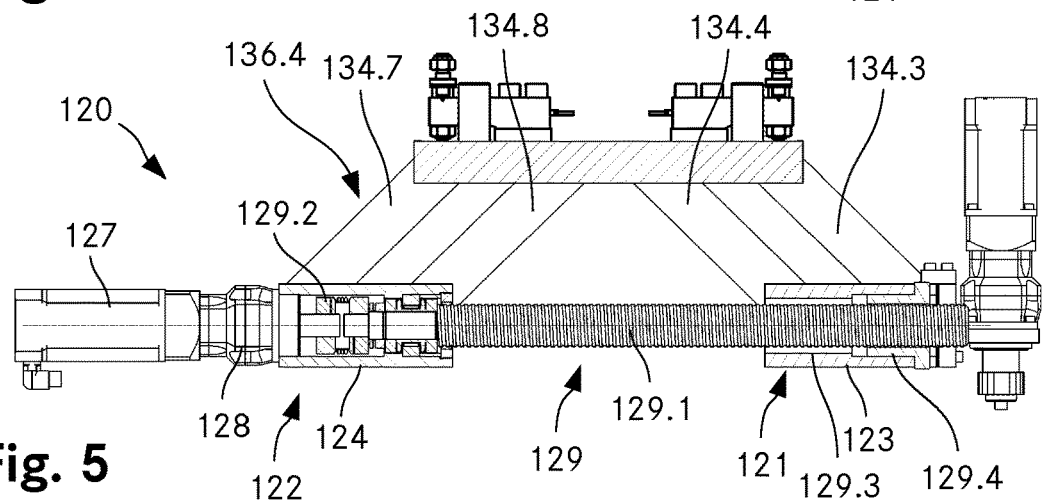
FIG. 5 depicts a cross-sectional view of the lifting unit in the lowered state.
Figure 6:
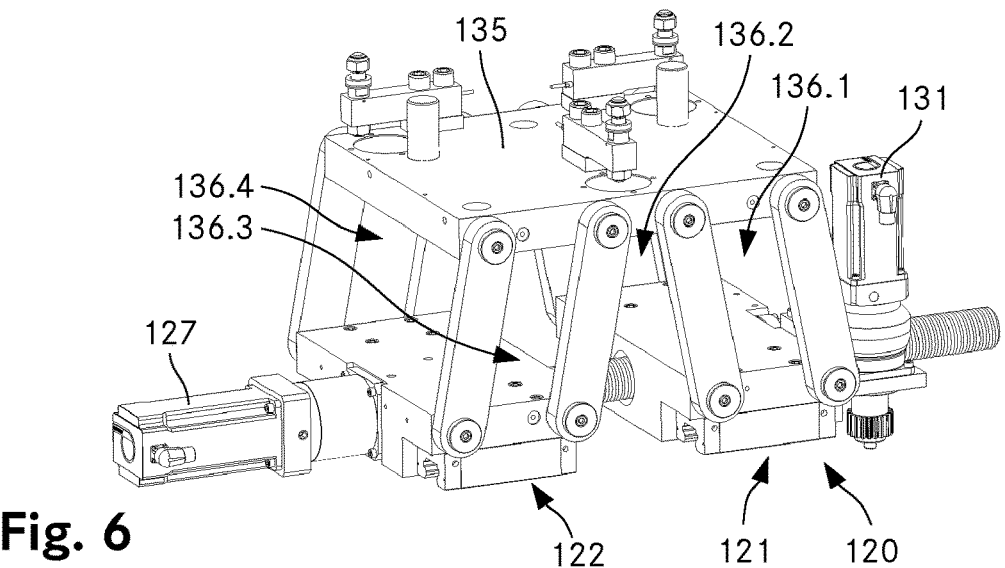
FIG. 6 depicts an oblique view of the lifting unit in the raised state.

FIG. 4 shows an oblique view of the lifting unit of a wheel carrier, FIG. 5 a cross-sectional view of the lifting unit in the lowered state and FIG. 6 an oblique view of the lifting unit in the raised state. The lifting unit 120 comprises two linear slides 121, 122, each of which has a carrier 123, 124 on the underside of which two guide carriages 125.1, 125.2; 126.1, 126.2 are mounted. These each comprise several ball tracks which, when the wheel carrier is mounted, interact with running surfaces of the respective profile rail (cf. FIG. 3).

A drive motor 131 is arranged on the outer end face of the carrier 123 of one of the linear slides 121. This is a servomotor with a vertically oriented drive axis. The latter acts via a planetary gear 132 on a pinion 133, which meshes with the toothed rack running parallel to the linear guide (cf. FIG. 3). The drive motor 131 is designed so that the output rotates essentially freely when the motor is de-energized.

Another drive motor 127 is arranged on the carrier 124 of the other linear slide 122. This is again a servomotor, but its drive axis is oriented horizontally and runs longitudinally in the center of the carrier 124. The drive motor 127 acts via a planetary gear 128 on a spindle 129.1 of a ball screw 129, which further comprises a first bearing 129.2 in the linear slide 122 with the drive motor 127 and a second bearing 129.3 in the other linear slide 121. The latter comprises a rotatable but axially immovable threaded sleeve 129.4 which interacts with the external thread of the spindle 129.1 so that the distance between the two linear slides 121, 122 can be adjusted with the aid of the drive motor 127.

Two levers 134.1 . . . 8 of the same length are articulated on each of the side faces of the carriers 123, 124 via corresponding pivot bearings arranged at a horizontal distance. The levers are articulated to the platform 135 in bearings arranged laterally at the same horizontal distance, so that a total of four four-bar linkages 136.1, 136.2, 136.3, 136.4 are formed.

Two vertically oriented cylindrical guide pins 137.1, 137.2 are arranged on the upper side of the platform 135, as are three measuring cells 138.1, 138.2, 138.3, which form a triangle. The latter are designed as shear beam measuring cells. The force application points are each located near the lateral edge of the platform 135, the application point of the first measuring cell 138.1 is arranged centrally in the longitudinal direction, the application points of the other measuring cells 138.2, 138.3 are arranged near the longitudinal ends of the platform 135 so that the best possible force distribution is achieved.

FIGS. 4 and 5 show the lifting unit 120 in the lowered state, i.e., the two linear slides 121, 122 are at their maximum distance, and the platform 135 is at a minimum distance from the plane defined by the linear slides 121, 122. In FIG. 6, the lifting unit 120 is shown in its maximum raised state. The distance between the linear slides 121, 122 is smaller, and the distance of the platform 135 from the plane is larger due to the lever mechanism with the four four-bar linkages 136.1 . . . 4. Thus, the height of the platform 135 can be adjusted by operating the drive motor 127, with a maximum stroke of about 80 mm. The lifting unit 120 can also be positioned as a whole along the linear guide (i.e. parallel to the inlet rails) by means of the drive motor 131.

Figure 7:
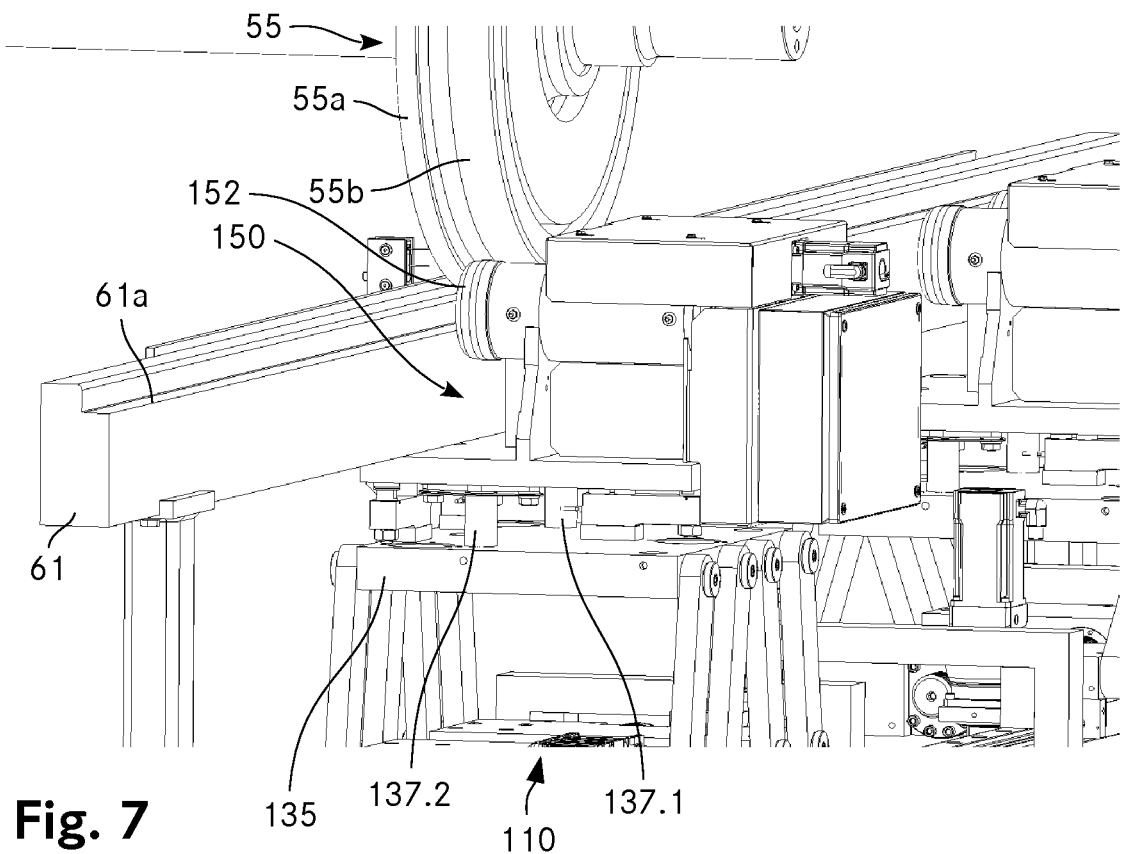
FIG. 7 depicts an oblique view illustrating the interaction of an inlet rail and the wheel receiving device of the wheel carrier with a running wheel of the bogie.

FIG. 7 shows an oblique view illustrating the interaction of an inlet rail and the wheel receiving device of the wheel carrier with a bogie wheel.

The wheel receiving unit 150 of the wheel carrier 110 is positioned on the platform 135. It rests on the three measuring cells and is guided by the two guide pins 137.1, 137.2. For this purpose, the wheel receiving unit 150 has two openings on its underside that are slightly larger than the cross section of the guide pins 137.1, 137.2 that they accommodate. Furthermore, disk springs are used to fix the wheel receiving unit 150 with its openings relative to the guide pins 137.1, 137.2.

The wheel carriers 110 are arranged adjacent to the inlet rail 61 in such a way that the rollers 152 of the wheel receiving units 150 can interact with a tread 55b of the respective wheel 55, while the wheel 55 rolls with its wheel flange 55a on a tread 61a of the inlet rail 61. A vertical movement of the wheel receiving unit 150 can influence whether and how its rollers 152 interact with the wheel 55:

in a lowered position, there is no interaction between the rollers 152 of the wheel receiving unit 150 and the wheel 55, and the corresponding wheel carrier 110 can also be passed underneath the wheel 55;

in a middle position, the rollers 152 of the wheel receiving unit 150 contact the tread 55*b* of the wheel 55, but the latter is still supported on the inlet rail 61 by means of the wheel flange 55*a*—in this way, the bogie can be moved along the inlet rail 61 with the aid of the wheel carriers 110;

in a raised position, the wheel 55 is fully supported on the rollers 152 of the wheel receiving unit 150; the wheel flange 55*a* has lost contact with the inlet rail 61—in this position, force measurements can be made to test the bogie because all forces acting on the wheel 55 are transmitted via the measuring cells of the wheel carrier 110.

Figure 8:
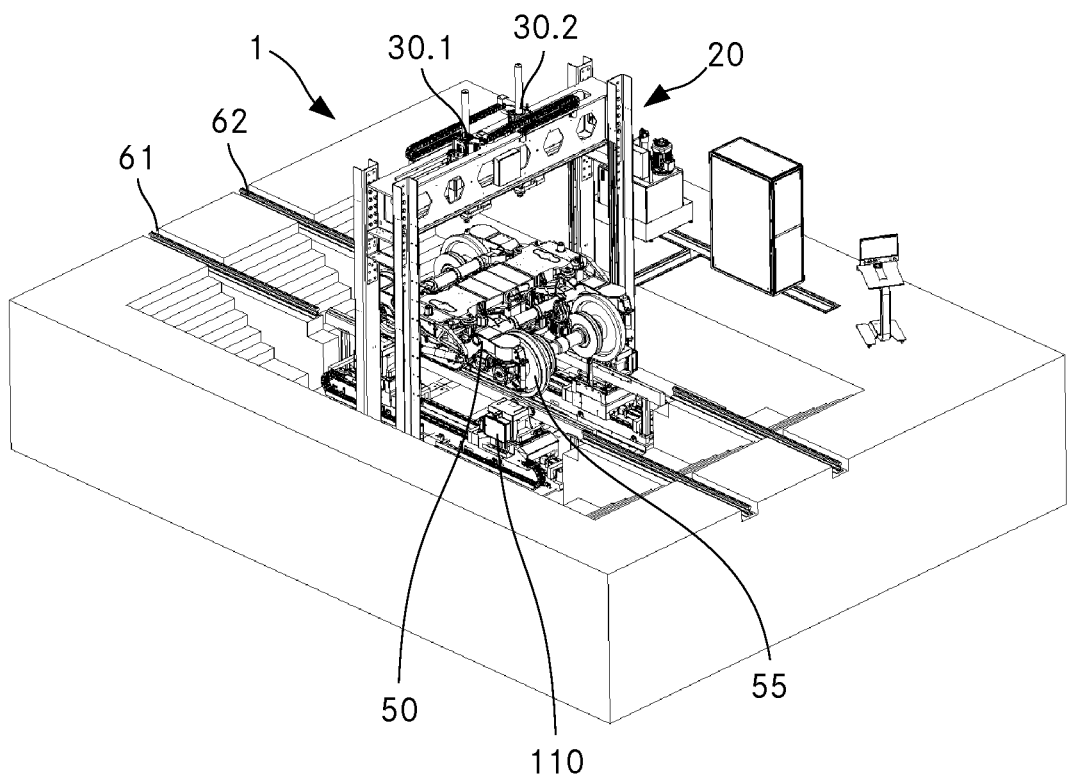
FIG. 8 depicts an oblique view of the test stand with the bogie in the test position.

FIG. 8 shows an oblique view of the test stand 1 with the bogie 50 in the test position. In this position, vertical forces can be applied to the bogie 50 by means of the load application units 30.1, 30.2. Forces exerted by the wheels 55 of the bogie 50 on the wheel carriers 110 are recorded in a manner known per se with the aid of the measuring cells described, transmitted to an evaluation device and evaluated there.

Placement of the bogie 50 in the test position includes the following steps:

1. The bogie 50 is placed on the inlet rails 61, 62 in one end area so that the wheel flanges of the wheels 55 can roll on the running surfaces of the inlet rails 61, 62. The bogie can be set down with the aid of a crane, for example.
2. The two wheel carriers 110 facing the bogie 50 are moved under the bogie 50 so that they are positioned below the front wheels 55 facing the portal 20.
3. The aforementioned two wheel carriers 110 are raised until they reach their middle position, in which the rollers of the wheel carriers 110 interact with the treads of the wheels 55; however, the wheels 55 continue to be supported by their wheel flanges on the inlet rails 61, 62.
4. The aforementioned two wheel carriers 110 are moved in the direction of the portal 20, at least until the rear wheels 55 facing away from the portal 20 are also within the travel range of the wheel carriers 110.
5. All wheel carriers 110 are lowered so that they can move underneath the bogie 50 along their guide parallel to the inlet rails 61, 62. They are then moved to the positions of the four wheels 55 of the bogie 50.
6. Now all wheel carriers 110 are raised to their middle position. All wheels 55 of the bogie 50 now interact with one wheel carrier 110 each.
7. The bogie 50 can now be moved to an axially centered position below the gantry 20.
8. Now all wheel carriers 110 are lifted further until the wheel flanges of the wheels 55 detach from the inlet rails 61, 62. The ball screw of the lifting unit is now fixed via the motor brake of the corresponding drive motor, so the height of the wheels is also fixed.
9. The bogie 50 can now still be centered transverse to the running-in direction. For this purpose, the aforementioned tappets in the wheel mounting device are moved inward as required to push the wheels 55 at the wheel shoulder to the desired transverse position.
10. The drive motors for the pinions are now de-energized so that the wheel carriers can move freely along their guides.
11. Now the forces can be applied and the resulting forces on the wheel carriers can be recorded with the aid of the measuring cells. Changes in the wheelbase due to the application of forces are compensated for by allowing the wheel carriers to move essentially unimpeded along their guides. During the measurement process, the wheels 55 are rotated by means of the driven rollers of the wheel carriers 110 to avoid static bending and deformation.

The device according to the invention can also be used to simulate the insertion of shim plates. For this purpose, those wheel carriers for which the insertion of a shim plate is to be simulated are raised further. As soon as a balanced load distribution is obtained, the thicknesses of the required shims can be calculated from the additional lifting. A torsion test is also possible by raising the wheel carriers to different heights.

The device according to the invention enables simple calibration of the measuring cells and/or the load application units by aligning the corresponding wheel carrier and a load application unit with each other and inserting a reference measuring cell between the load application unit and the wheel carrier. The system can then be loaded by means of the load application unit, with the acting forces being measured by the reference measuring cell and the measuring cells.

Figure 9:
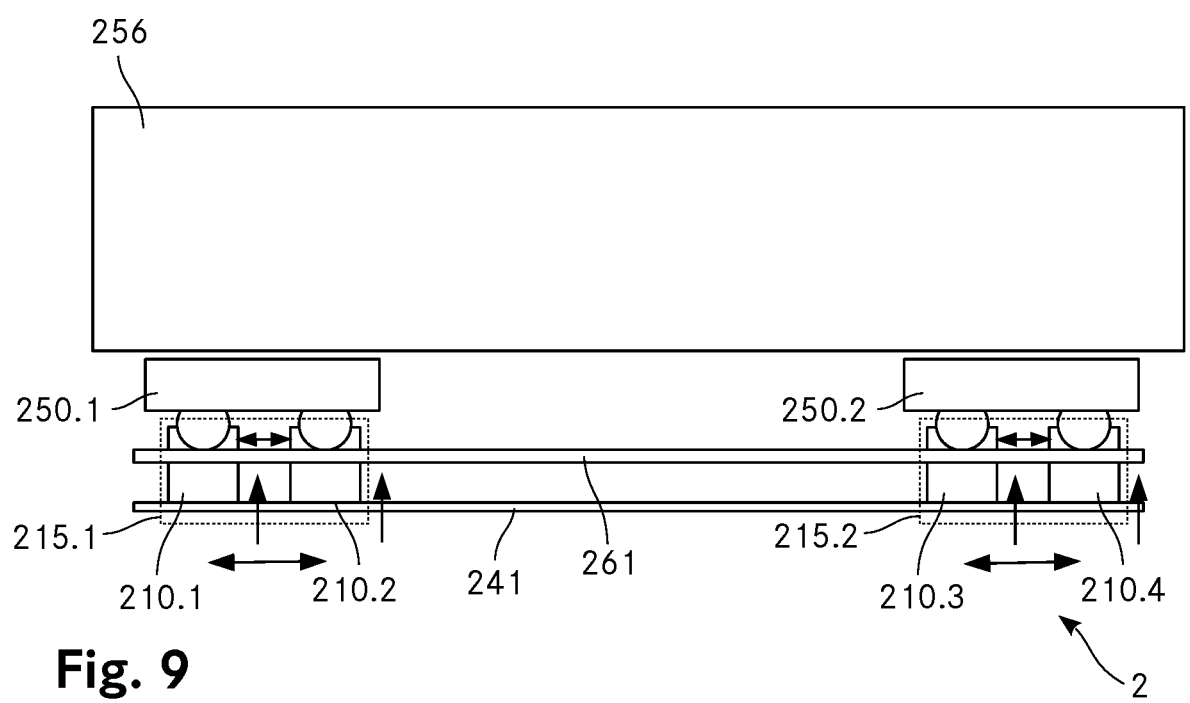
FIG. 9 depicts a schematic drawing of a further embodiment of the test stand according to the invention.

FIG. 9 is a schematic drawing of a further embodiment of the test stand according to the invention. This corresponds in many respects to the embodiment described above. The test stand 2 according to the further embodiment is used for torsion testing of two bogies 250.1, 250.2 attached to a car body 256. The car to be tested is moved on the inlet rails 261 to the wheel carriers 210.1, 210.2, 210.3, 210.4, where it is gripped by them as described above. The application force on the bogies 250.1, 250.2 is provided by the car body 256 itself. The twisting is caused by a different height setting of the wheel carriers 210.1, 210.2, 210.3, 210.4 (and of the corresponding mirror image of the other four wheel carriers arranged on the other side). The test stand 2 can be easily adapted to the dimensions of the bogies 250.1, 250.2 and the car body 256. For this purpose, on the one hand the distances between the wheel carriers 210.1, 210.2; 210.3, 210.4 of the respective wheel carrier group 215.1, 215.2 are adjusted and, on the other hand, the distance between the two wheel carrier groups 215.1, 215.2 is adjusted by moving the wheel carriers 210.1 . . . 4 along the corresponding profile rail 241. The invention is not limited to the illustrated embodiments. In particular, design details can be solved differently. The dimensions of the test stand can be selected differently, depending in particular on the bogies to be tested. For bogies with more than four wheels, additional wheel carriers can be provided.

In summary, the invention creates a test stand for testing bogies which has a simple design. The scope of protection of the present invention is given by the claims and is not limited by the features illustrated in the description or shown in the figures.

The invention claimed is:

1. A wheel carrier configured to support a running wheel arranged on a bogie, the wheel carrier comprising a lifting unit comprising:
   a platform;
   a first linear slide arranged to move along a longitudinal guide extending in a running direction perpendicular to an application direction;
   a second linear slide arranged to move along the longitudinal guide in the running direction;
   a first lever mechanism configured to couple the first linear slide to the platform; and a second lever mechanism configured to couple the second linear slide to the platform; and wherein a distance between the first linear slide and the second linear slide is variable so that a distance of the platform from the first linear slide and from the second linear slide is variable in the application direction.

2. The wheel carrier according to claim 1, wherein:
the first lever mechanism comprises two four-bar linkages;
the second lever mechanism comprises two further four-bar linkages, and
the lever axes of all levers of the four-bar linkages are arranged to extend parallel to each other and perpendicular to the running direction.

3. The wheel carrier according to claim 2, wherein,
the two four-bar linkages are spaced apart from each other in a direction of the lever axes, and
the two further four-bar linkages are spaced apart from each other in the direction of the lever axes.

4. The wheel carrier according to claim 1, wherein the first linear slide and the second linear slide are mechanically connected to one another by a device for adjusting their distance from one another.

5. The wheel carrier according to claim 4, wherein the device for adjusting the distance comprises:
a) a threaded spindle mounted rotatably and axially immovably on one of the linear slides, the axis of rotation of which extends in the running direction, and
b) a rotatable driver arranged on the other of the linear slides.

6. The wheel carrier according to claim 5, wherein the threaded spindle and the driver form a ball screw.

7. The wheel carrier according to claim 1, wherein a drive motor is arranged on the first linear slide, the output of which drive motor acting on a pinion, the pinion cooperating with a rack extending in the running direction for displacing the first linear slide.

8. A test stand for testing bogies of rail vehicles, comprising a support device for supporting a bogie during a testing operation, comprising a plurality of wheel carriers, each wheel carrier configured to support a running wheel arranged on the bogie, each wheel carrier comprising a lifting unit comprising:
a platform;
a first linear slide arranged to move along a longitudinal guide extending in a running direction perpendicular to an application direction;
a second linear slide arranged to move along the longitudinal guide in the running direction;
a first lever mechanism configured to couple the first linear slide to the platform; and
a second lever mechanism configured to couple the second linear slide to the platform; and
wherein a distance between the first linear slide and the second linear slide is variable so that a distance of the platform from the first linear slide and from the second linear slide is variable in the application direction.

9. The test stand according to claim 8, further comprising:
a load application unit configured to generate a linear application force on the bogie, the load application unit comprising a force generation unit configured to generate a basic force and a transmission device configured to transmit the basic force into the application force oriented in an application direction so as to act on the bogie.

10. The test stand according to claim 8, wherein the support device further comprises at least eight wheel carriers configured and arranged to support all running wheels of at least two bogies arranged on a car body.

11. The test stand according to claim 8, further comprising two parallel inlet rails extending in the running direction and configured to feed a bogie to be measured.

12. The test stand according to claim 11, wherein:
the longitudinal guide and the inlet rails are arranged such that wheel receiving devices arranged on platforms of wheel carriers are configured to move by a vertical movement of the respective platform between an engagement position and a release position,
in the engagement position, wheel carrier forces are arranged to be transmitted in the running direction between the respective wheel receiving device and the respective running wheel, and
in the release position the respective wheel carrier is freely movable in the running direction with respect to the bogie.

13. The test stand according to claim 8, wherein each of the wheel carriers further comprises a wheel receiving device arranged on the platform and a force measuring unit configured to measure a force applied to the wheel receiving device.

14. A method for testing a bogie of a rail vehicle, comprising the following steps:
a) running, in the bogie, along a running direction, the running comprising the step of running off flanges of running wheels arranged on the bogie on two parallel inlet rails;
b) positioning the bogie and a plurality of wheel carriers of a support device relative to each other, along the running direction, such that each of the running wheels is associated with a wheel carrier, wherein each of the wheel carriers comprises a lifting unit comprising:
a platform,
a first linear slide configured to slide along a longitudinal guide extending in the running direction,
a second linear slide configured to slide along the longitudinal guide in the running direction,
a first lever mechanism configured to couple the first linear slide to the platform, and
a second lever mechanism configured to couple the second linear slide to the platform;
c) gripping the bogie by reducing a distance between the first linear slide and the second linear slide of such that the wheel carriers are lifted and are made to grip the running wheels in an area of tread of at least one of the running wheels;
d) lifting the bogie until the wheel flanges are lifted off the inlet rails; and
e) testing the bogie by:
applying a linear application force to the bogie, the linear application force being perpendicular to the running direction, and
measuring forces acting on the wheel carriers.

15. The method according to claim 14, wherein the step of testing further comprising the steps of configuring and arranging all linear carriages to be freely movable in the running direction, while distances between the first linear carriages and the second linear carriages of a respective wheel carrier are fixed.

16. The method according to claim 15, further comprising the steps of arranging, at each of the wheel carriers and on the first linear carriage, a drive motor to act on a pinion, the pinion arranged to cooperate with a rack extending in the running direction and configured to displace the first linear carriage, wherein the step of testing further comprises the step of releasing the pinion for free rotation by de-energizing an electric drive motor for the pinion.

17. The method according to claim 14, further comprising the step of simulating an insertion of washers by individually adjusting the heights of the wheel carriers.

18. The method according to claim 14, further comprising the step of positioning the bogie by moving the wheel carriers along the running direction, in an application position of a load application unit, wherein a linear application force is applied by means of the load application unit.

19. The method according to claim 14, further comprising the steps of:
   arranging two bogies on one car body and such that all running wheels of the two bogies are simultaneously received by corresponding wheel carriers, and
   performing a torsion test by adjusting different heights of the wheel carriers, the linear application force being exerted by means of a dead weight of the car body.

20. The method of claim 19, further comprising the step of adjusting a spacing of two groups of wheel carriers to a spacing of the bogies on the car body.

\* \* \* \* \*